: US 10,948,345 B2
(45) Date of Patent: Mar. 16, 2021

(54) HANDHELD LASER FLUORESCENCE SPECTRUM PROBE ASSEMBLY

(71) Applicant: Nanjing Nuoyuan Medical Devices Co., Ltd., Nanjing (CN)

(72) Inventors: Huiming Cai, Nanjing (CN); Yiqing Wang, Nanjing (CN)

(73) Assignee: NANJING NUOYUAN MEDICAL DEVICES CO., LTD, Jiangsu (CN)

( * ) Notice: Subject to any disclaimer, the term of this patent is extended or adjusted under 35 U.S.C. 154(b) by 0 days.

(21) Appl. No.: 16/438,127

(22) Filed: Jun. 11, 2019

(65) Prior Publication Data

US 2020/0326236 A1 Oct. 15, 2020

(30) Foreign Application Priority Data

Apr. 10, 2019 (CN) .......................... 201910287433.2

(51) Int. Cl.
*G01J 3/02* (2006.01)
*G01J 3/44* (2006.01)
(52) U.S. Cl.
CPC ........... *G01J 3/0272* (2013.01); *G01J 3/0208* (2013.01); *G01J 3/0218* (2013.01); *G01J 3/4406* (2013.01)
(58) Field of Classification Search
CPC .................................................... G01J 3/0272
USPC ......................................................... 356/317
See application file for complete search history.

(56) References Cited

U.S. PATENT DOCUMENTS

| | | | | |
|---|---|---|---|---|
| 2007/0167681 A1* | 7/2007 | Gill | ....................... | A61B 1/0607 600/112 |
| 2009/0062662 A1* | 3/2009 | Zuluaga | ............. | A61B 1/00048 600/478 |
| 2011/0319759 A1* | 12/2011 | Liu | ..................... | A61B 10/0241 600/439 |
| 2013/0006116 A1* | 1/2013 | Kim | ................... | G01N 21/6428 600/476 |
| 2016/0007854 A1* | 1/2016 | Iftimia | ................... | A61B 5/742 600/424 |

FOREIGN PATENT DOCUMENTS

CN   206479726   *  9/2017   ............. G02B 27/09

* cited by examiner

*Primary Examiner* — Tarifur R Chowdhury
*Assistant Examiner* — Omar H Nixon
(74) *Attorney, Agent, or Firm* — Dinsmore & Shohl LLP

(57) ABSTRACT

The present disclosure provides a handheld laser fluorescence spectrum probe assembly, which relates to the technical field of fluorescence spectrum detection, and is designed for solving the problem of low detection precision with fluorescence spectrum detection. The handheld laser fluorescence spectrum probe assembly includes a handheld pen-like tube, an optical fiber, and a tube sleeve, wherein a first end of the tube sleeve is detachably connected with a first end of the handheld pen-like tube; a first end of the optical fiber is inserted in the handheld pen-like tube from a second end of the handheld pen-like tube, the first end of the optical fiber is connected with a dodging lens, and a distance between an end face of an end of the dodging lens away from the optical fiber and an end face of a second end of the tube sleeve is 22-28 mm.

16 Claims, 1 Drawing Sheet

HANDHELD LASER FLUORESCENCE SPECTRUM PROBE ASSEMBLY

CROSS-REFERENCE TO RELATED APPLICATION

The present disclosure claims the priority to the Chinese Patent Application with the filing number 201910287433.2 filed with the Chinese Patent Office on Apr. 10, 2019, entitled "Handheld Laser Fluorescence Spectrum Probe Assembly", the contents of which are incorporated in the present disclosure by reference in its entirety.

TECHNICAL FIELD

The present disclosure relates to the technical field of fluorescence spectrum detection, in particular to a handheld laser fluorescence spectrum probe assembly.

BACKGROUND ART

Generally, measurement of reflection or fluorescence or Raman signal plays a great role in biological medical applications, for example, for early diagnosis of specific changes of diseases at a molecular level.

Reflectance spectrometry is analysis of light reflected from tissues. Tissue reflectance spectrometry can be used to deduce information on molecules intensively absorbing light (e.g. tissue chromophores). It further can be used to deduce information on tissue scatterer, such as size and distribution of cell nucleus and mean cell density. Fluorescence spectroscopy is analysis of fluorescence emission from tissues. Natural tissue fluorophores (molecules emitting fluorescence when excited by light with a suitable wavelength) may be sensitive to chemical composition and chemical environment changes associated with transformation of diseases. However, existing fluorescence spectrum probes have relatively low detection precision.

Therefore, to provide a handheld laser fluorescence spectrum probe assembly with high detection precision becomes an important technical problem to be solved by those skilled in the art.

SUMMARY

An embodiment of the present disclosure provides a handheld laser fluorescence spectrum probe assembly, including a handheld pen-like tube, an optical fiber, and a tube sleeve;

a first end of the tube sleeve is detachably connected with a first end of the handheld pen-like tube;

a first end of the optical fiber is inserted in the handheld pen-like tube from a second end of the handheld pen-like tube, the first end of the optical fiber is connected with a dodging lens, and a distance between an end face of an end of the dodging lens away from the optical fiber and an end face of a second end of the tube sleeve is 22-28 mm.

BRIEF DESCRIPTION OF DRAWINGS

In order to more clearly illustrate technical solutions in specific embodiments of the present disclosure or in the prior art, accompanying drawings which need to be used for description of the specific embodiments or the prior art will be introduced briefly below. Apparently, the accompanying drawings in the following description are merely some embodiments of the present disclosure. Those ordinarily skilled in the art still can obtain other accompanying drawings in light of these accompanying drawings without inventive effort.

Figure 1:
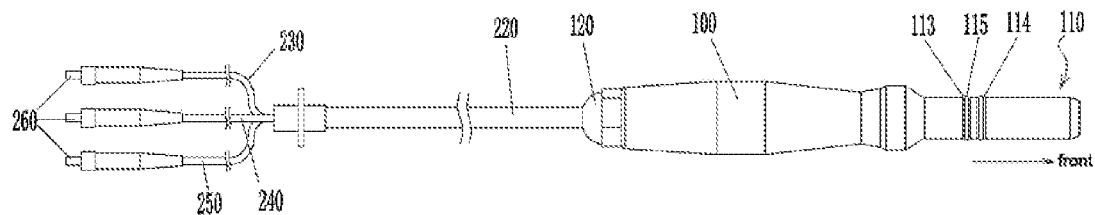
FIG. 1 is an overall structural schematic diagram of a handheld laser fluorescence spectrum probe assembly provided in an embodiment of the present disclosure.

REFERENCE SIGNS 100-handheld pen-like tube; 110-tube sleeve; 111-installation groove; 112-light-transmission sheet; 113-first annular groove; 114-second annular groove; 115-rubber ring; 120-connector;

200-optical fiber; 210-dodging lens; 220-master optical fiber; 230-first optical fiber; 240-second optical fiber; 250-third optical fiber; 260-SMA905 joint; 270-one-to-three optical splitter.

DETAILED DESCRIPTION OF EMBODIMENTS

Technical solutions of the present disclosure will be described below clearly and completely in conjunction with accompanying drawings. Apparently, the embodiments described are only some embodiments of the present disclosure, rather than all embodiments. All other embodiments obtained by those ordinarily skilled in the art based on the embodiments of the present disclosure without inventive effort shall fall into the scope of protection of the present disclosure.

In the description of the present disclosure, it should be understood that orientational or positional relations indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise", "axial", "radial", "circumferential" and so on are based on orientational or positional relations as shown in the accompanying drawings, merely for facilitating the description of the present disclosure and simplifying the description, rather than indicating or implying that referred apparatus or element have to be in the specific orientation or configured and operated in a specific orientation, therefore, they should not be construed as limitation on the present disclosure.

Besides, terms "first" and "second" are merely used for descriptive purpose, but should not be construed as indicating or implying relatively importance or suggesting the number of a referred technical feature. Thus, a feature defined with "first" or "second" may explicitly or implicitly mean including one or more such features. In the description of the present disclosure, "multiple" means two or more, unless explicitly defined otherwise.

In the present disclosure, unless explicitly specified and defined otherwise, terms such as "mount", "link", "connect", and "fix" should be construed in a broad sense. For example, it may be fixed connection, detachable connection, or integral connection; it may be mechanical connection, and also may be electrical connection; it may be direct linking, indirect linking through an intermediate medium, or internal communication between two elements or interaction relationship between two elements. For those ordinarily skilled in the art, specific meanings of the above-mentioned terms in the present disclosure can be understood according to specific circumstances.

The present disclosure provides a handheld laser fluorescence spectrum probe assembly, which solves the technical problem of low detection precision in the prior art.

An embodiment of the present disclosure provides a first possible implementation, wherein the distance between the end of the dodging lens away from the optical fiber and the second end of the tube sleeve is 25 mm An embodiment of the present disclosure provides a second possible implementation, wherein the second end of the above tube sleeve is provided with an installation groove, and a light-transmission sheet is provided inside the installation groove.

An embodiment of the present disclosure provides a third possible implementation, wherein the above optical fiber includes a master optical fiber, a first optical fiber configured to transmit excited light, a second optical fiber configured to transmit guiding light, and a third optical fiber configured to receive fluorescence;

a first end of the master optical fiber is inserted in the handheld pen-like tube, and an end of each of the first optical fiber, the second optical fiber, and the third optical fiber is connected with a second end of the master optical fiber.

An embodiment of the present disclosure provides a fourth possible implementation, wherein an end of each of the above first optical fiber, the second optical fiber, and the third optical fiber away from the master optical fiber is provided with an SMA905 joint.

An embodiment of the present disclosure provides a fifth possible implementation, wherein the above master optical fiber is connected with the first optical fiber, the second optical fiber, and the third optical fiber through a one-to-three optical splitter.

An embodiment of the present disclosure provides a sixth possible implementation, wherein a maximal outer diameter of the above dodging lens is greater than an inner diameter of the handheld pen-like tube;

the maximal outer diameter of the dodging lens is equal to an inner diameter of the tube sleeve.

An embodiment of the present disclosure provides a seventh possible implementation, wherein the above handheld pen-like tube is in threaded connection with the tube sleeve.

An embodiment of the present disclosure provides an eighth possible implementation, wherein a connector is fixedly provided on an outer wall of the above optical fiber;

the connector is in detachable connection with the second end of the handheld pen-like tube.

An embodiment of the present disclosure provides a ninth possible implementation, wherein the above connector is an externally-threaded nut, and the externally-threaded nut is in threaded connection with the handheld pen-like tube.

The present disclosure is further described in detail below with specific embodiments in combination with accompanying drawings.

Figure 2:
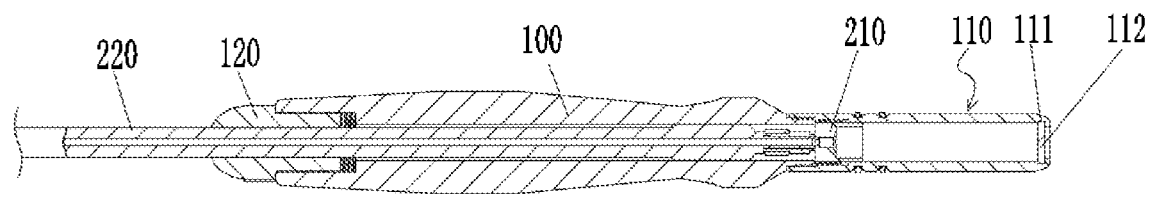
FIG. 2 is a local cross-sectional view of the handheld laser fluorescence spectrum probe assembly provided in an embodiment of the present disclosure.
Figure 3:
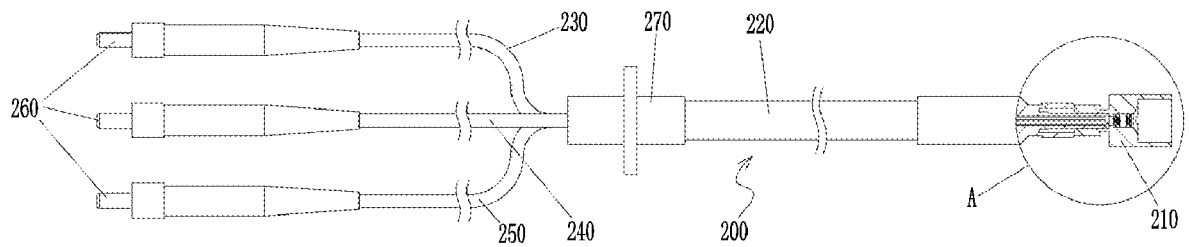
FIG. 3 is a schematic diagram of a connection structure of optical fibers and a dodging lens in the handheld laser fluorescence spectrum probe assembly provided in an embodiment of the present disclosure.
Figure 4:
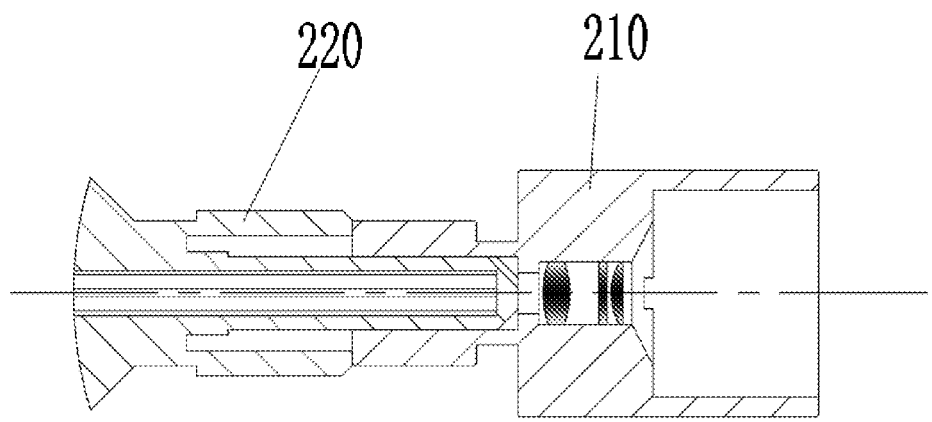
FIG. 4 is a local enlarged view of A in FIG. 3.

Referring to what is shown in FIG. 1 to FIG. 4:

The present embodiment provides a handheld laser fluorescence spectrum probe assembly, including a handheld pen-like tube 100, an optical fiber 200, and a tube sleeve 110, wherein a first end of the tube sleeve 110 is detachably connected with a first end of the handheld pen-like tube 100; a first end of the optical fiber 200 is inserted in the handheld pen-like tube 100 from a second end of the handheld pen-like tube 100, the first end of the optical fiber 200 is connected with a dodging lens 210 configured to homogenize excited light and fluorescence, and a distance between an end face of an end of the dodging lens 210 away from the optical fiber 200 and an end face of a second end of the tube sleeve 110 is 22-28 mm.

By providing the dodging lens 210, laser-excited light inside the handheld laser fluorescence spectrum probe assembly is enabled to uniformly irradiate on a patient's body, such that uniform fluorescence is excited, and the handheld laser fluorescence spectrum probe assembly can transmit the uniform fluorescence back to an analyzing device via the optical fiber 200, thus improving detection precision and accuracy; moreover, by providing the tube sleeve 110, in use, a front end of the tube sleeve 110 is put close to the patient, thus a distance between the dodging lens 210 and the patient can be maintained at 22-28 mm, facilitating an operation of a medical staff, and improving the detection precision and accuracy.

In the above, the end of the optical fiber 200 extending into the handheld pen-like tube 100 is connected with the dodging lens 210, and the laser-excited light inside the optical fiber 200 is uniformly emitted through the dodging lens 210, thus the laser-excited light can uniformly excite fluorescence in the patient's body, then the handheld laser fluorescence spectrum probe assembly can collect uniform fluorescence, reducing influences caused by nonuniform fluorescence excitation.

Specifically, the dodging lens 210 is provided for a purpose of uniformly emitting the excited light, and uniformly transmitting the collected fluorescence, after passing through the dodging lens 210, into the optical fiber 200. In the above, after passing through the dodging lens 210, light in two directions at two sides of the dodging lens 210 can uniformly irradiate.

In the above, the dodging lens 210 may be an imaging lens having subjected to anti-reflection processing.

It should be indicated that laser light emitted by an excited-light laser device adopted in the handheld laser fluorescence spectrum probe assembly has a continuous wavelength of 785 nm.

In the above, a material of the handheld pen-like tube 100 may be ABS plastic (acrylonitrile-butadiene-styrene copolymer).

In an optional solution of the present embodiment, the distance between the end of the dodging lens 210 away from the optical fiber 200 and the second end of the tube sleeve 110 is 25 mm.

In the prior art, there is no tube sleeve 110 on the handheld laser fluorescence spectrum probe assembly, then when the handheld laser fluorescence spectrum probe assembly is used by a medical staff, the medical staff needs to make the dodging lens 210 of the handheld laser fluorescence spectrum probe assembly 25 mm away from the patient through his/her own control and coordination, thus the use is quite inconvenient, and different medical staff also effectuates different distances, resulting in a relatively big detection precision error. But in the present embodiment, the tube sleeve 110 is provided at the first end (the end oriented towards the patient in use, i.e. the front end) of the handheld pen-like tube 100, and the distance between the dodging lens 210 and the patient is restricted by the tube sleeve 110. In use, the medical staff puts the tube sleeve 110 close to the patient, at which time the distance between the dodging lens 210 and the patient's body is about 25 mm, thus the error is quite small, and the medical staff does not need to estimate the distance according to his/her experience, thereby improving the precision and accuracy of the detection.

Moreover, the tube sleeve 110 is detachably connected with the handheld pen-like tube 100, and a in long-term use process, if the tube sleeve 110 is damaged or other events affecting the use happen, the medical staff can detach and change the tube sleeve 110, without changing the entire handheld laser fluorescence spectrum probe assembly, thus greatly saving the cost.

In an optional solution of the present embodiment, the optical fiber 200 includes a master optical fiber 220, a first optical fiber 230 configured to transmit the excited light, a second optical fiber 240 configured to transmit guiding light, and a third optical fiber 250 configured to receive fluorescence, wherein a first end of the master optical fiber 220 is inserted in the handheld pen-like tube 100, an end of each of the first optical fiber 230, the second optical fiber 240, and the third optical fiber 250 is connected with a second end of the master optical fiber 220.

In an optional solution of the present embodiment, the master optical fiber 220 is connected with the first optical fiber 230, the second optical fiber 240, and the third optical fiber 250 through a one-to-three optical splitter 270.

In assembling, the master optical fiber 220 is inserted in the handheld pen-like tube 100, then the end of the master optical fiber 220 inserted in the handheld pen-like tube 100 is connected with the dodging lens 210, the other end of the master optical fiber 220 is connected with the three, i.e. the first optical fiber 230, the second optical fiber 240, and the third optical fiber 250 through the one-to-three optical splitter 270, wherein the first optical fiber 230 is connected with a light source of the laser-excited light, the second optical fiber 240 is connected with a light source of the guiding light, and the third optical fiber 250 is connected with a spectrograph, wherein the spectrograph is provided with a filter light path, through which light with a relative wavelength of 808-847 nm is transmitted, reducing adverse effects of light with other irrelevant wavelengths (natural light and laser-excited light) on the fluorescence detection precision, thus improving the precision and accuracy of the detection.

Specifically, when emitted from the light source of the laser-excited light, the laser-excited light is transmitted into the master optical fiber 220 along the first optical fiber 230, then exits from a front end of the master optical fiber 220, and uniformly irradiates on tissues of the patient generating an EPR (enhanced permeability and retention) effect, such that the excited fluorescence is also uniform. The guiding light emitted from the light source of the guiding light is transmitted into the master optical fiber 220 along the second optical fiber 240, and then exits from the front end of the master optical fiber 220. In use, the laser-excited light is invisible to naked eyes, therefore, a position where a laser machine emits light is marked with the guiding light, facilitating a medical staff in recognition; after the fluorescence is excited, the excited fluorescence will irradiate into the tube sleeve 110, then pass through the dodging lens 210 to enter the master optical fiber 220, and transmit along the master optical fiber 220 to be then divided into three parts to enter the three, i.e. first optical fiber 230, the second optical fiber 240, and the third optical fiber 250, respectively, moreover, only the fluorescence entering the third optical fiber 250 can enter the spectrograph, furthermore, the fluorescence entering the first optical fiber 230 and the second optical fiber 240 will not affect normal operations of the laser-excited light and the guiding light. With such configuration, the collected fluorescence (further including natural light, excited light therein) is evenly divided into three parts, to reduce intensity of the fluorescence (further including natural light, excited light therein), thus reducing mutual interference within the fluorescence (further including natural light, excited light therein), accordingly improving the accuracy and precision of the detection.

In the above, the master optical fiber 220 is connected with the three, i.e. the first optical fiber 230, the second optical fiber 240, and the third optical fiber 250 through the one-to-three optical splitter 270, and the collected light (fluorescence generated from excitation, laser-excited light, and natural light) inside the master optical fiber 220 is equally divided and enters the first optical fiber 230, the second optical fiber 240, and the third optical fiber 250, respectively, so as to reduce the intensity of the collected light inside the third optical fiber 250, thus reducing mutual interference among the fluorescence, the laser-excited light, and the natural light.

It should be indicated that the collected light inside the first optical fiber 230, when passing through the filter, can filter out natural light and excited light therein, but merely retaining the fluorescence with a wavelength of 808-847 nm.

In an optional solution of the present embodiment, an end of each of the first optical fiber 230, the second optical fiber 240, and the third optical fiber 250 away from the master optical fiber 220 is provided with an SMA905 (a model of a universal joint for optical fibers) joint 260.

The first optical fiber 230 is connected with the light source of the laser-excited light through the SMA905 joint 260, the second optical fiber 240 is connected with the light source of the guiding light through the SMA905 joint 260, and the third optical fiber 250 is connected with the spectrograph through the SMA905 joint 260.

In the above, the fluorescence spectrograph is provided with mounting feet in a bottom portion, facilitating stable fixation of the fluorescence spectrograph at a designated position, and reducing adverse effects caused by external vibration to the fluorescence spectrograph.

It should be indicated that the SMA905 joints are SMA905 optical fiber joints with following standard dimensions: 3.17 mm, 9.8 mm, and 1/4-36 thread, respectively for core diameter, core length, and screw cap specification.

In an optional solution of the present embodiment, a maximal outer diameter of the dodging lens 210 is greater than an inner diameter of the handheld pen-like tube 100; the maximal outer diameter of the dodging lens 210 is equal to an inner diameter of the tube sleeve 110. Thus, the dodging lens 210 is prevented from moving in the handheld pen-like tube 100 to cause damage to light rays.

In an optional solution of the present embodiment, the second end of tube sleeve 110 is provided with an installation groove 111, and a light-transmission sheet 112 is provided inside the installation groove 111. After exiting from the dodging lens 210, the excited light will pass through the light-transmission sheet 112, while the light-transmission sheet 112 will not influence the excited light; the light-transmission sheet 112 provided can cooperate with the tube sleeve 110 to form a closed space, thus reducing or even avoiding adverse influences to the dodging lens 210 caused by external pollutants entering inside of the tube sleeve 110.

In the above, the light-transmission sheet 112 is a glass sheet, and specifically, the light-transmission sheet 112 may be organic glass.

In an optional solution of the present embodiment, the handheld pen-like tube 100 is in threaded connection with the tube sleeve 110. With such configuration, the detachment of the handheld pen-like tube 100 and the tube sleeve 110 is facilitated.

In an optional solution of the present embodiment, a connector 120 is fixedly provided on an outer wall of the optical fiber 200; the connector 120 is in detachable connection with the second end of the handheld pen-like tube 100.

In an optional solution of the present embodiment, the connector 120 is an externally-threaded nut, and the externally-threaded nut is in threaded connection with the handheld pen-like tube 100.

The optical fiber 200 is fixed inside the handheld pen-like tube 100 through the connector 120; in installation, first the optical fiber 200 is inserted in the handheld pen-like tube 100, then the connector 120 and the handheld pen-like tube 100 are made in threaded connection together, thus facilitating the installation.

In the above, a material of the connector 120 may be ABS plastic.

In the above, a material of the tube sleeve 110 is latex; moreover, two annular grooves are provided on an outer wall of the tube sleeve 110, wherein the two annular grooves are each provided with a rubber ring 115, wherein a position of a first annular groove 113 is corresponding to an outer wall of the dodging lens 210, and after the rubber ring 115 is provided inside the first annular groove 113, the tube sleeve 110 will tightly clamp the dodging lens 210, avoiding arbitrary movement of the dodging lens 210 inside the tube sleeve 110. The second annular groove 114 is located in front of the dodging lens 210 (a plane where the second annular groove 114 is located is not in contact with the dodging lens 210), after being provided inside the second annular groove 114, the rubber ring 115 can press against the tube sleeve 110 to contract, preventing the dodging lens 210 from sliding forwardly.

Beneficial Effects:

The embodiments of the present disclosure provide a handheld laser fluorescence spectrum probe assembly, including the handheld pen-like tube, the optical fiber, and the tube sleeve; the first end of the tube sleeve is detachably connected with the first end of the handheld pen-like tube; the first end of the optical fiber is inserted in the handheld pen-like tube from the second end of the handheld pen-like tube, the first end of the optical fiber is connected with the dodging lens configured to homogenize excited light and fluorescence, and the distance between the end face of the end of the dodging lens away from the optical fiber and the end face of the second end of the tube sleeve is 22-28 mm. By providing the dodging lens, laser-excited light inside the handheld laser fluorescence spectrum probe assembly is enabled to uniformly irradiate on a patient's body, such that uniform fluorescence is excited, and the handheld laser fluorescence spectrum probe assembly can transmit the uniform fluorescence back to an analyzing device via the optical fiber, thus improving detection precision and accuracy; moreover, by providing the tube sleeve, in use, a front end of the tube sleeve is put close to the patient, thus a distance between the dodging lens and the patient can be maintained at 22-28 mm, facilitating an operation of a medical staff, and improving the detection precision and accuracy.

Finally, it should be explained that the various embodiments above are merely used for illustrating the technical solutions of the present disclosure, rather than limiting the present disclosure. While the detailed description is made to the present disclosure with reference to various preceding embodiments, those ordinarily skilled in the art should understand that they still can modify the technical solutions recited in the various preceding embodiments, or make equivalent substitutions to some or all of the technical features therein. These modifications or substitutions do not make the essence of corresponding technical solutions depart from the scope of the technical solutions of the various embodiments of the present disclosure.

What is claimed is:

1. A handheld laser fluorescence spectrum probe assembly, comprising a handheld pen-like tube, an optical fiber, and a tube sleeve, wherein
    a first end of the tube sleeve is detachably connected with a first end of the handheld pen-like tube;
    a first end of the optical fiber is inserted in the handheld pen-like tube from a second end of the handheld pen-like tube, the first end of the optical fiber is connected with a dodging lens configured to homogenize excited light and fluorescence, and a distance between an end of the dodging lens away from the optical fiber and an end face of a second end of the tube sleeve is 22-28 mm;
    wherein a maximal outer diameter of the dodging lens is greater than an inner diameter of the handheld pen-like tube, and the maximal outer diameter of the dodging lens is equal to an inner diameter of the tube sleeve.

2. The handheld laser fluorescence spectrum probe assembly according to claim 1, wherein a distance between the end of the dodging lens away from the optical fiber and the second end of the tube sleeve is 25 mm.

3. The handheld laser fluorescence spectrum probe assembly according to claim 2, wherein the handheld pen-like tube is in threaded connection with the tube sleeve.

4. The handheld laser fluorescence spectrum probe assembly according to claim 2, wherein a connector is fixedly provided on an outer wall of the optical fiber; and
    the connector is in detachable connection with the second end of the handheld pen-like tube.

5. The handheld laser fluorescence spectrum probe assembly according to claim 1, wherein the second end of the tube sleeve is provided with an installation groove, and a light-transmission sheet is provided inside the installation groove.

6. The handheld laser fluorescence spectrum probe assembly according to claim 5, wherein the handheld pen-like tube is in threaded connection with the tube sleeve.

7. The handheld laser fluorescence spectrum probe assembly according to claim 5, wherein a connector is fixedly provided on an outer wall of the optical fiber; and
    the connector is in detachable connection with the second end of the handheld pen-like tube.

8. The handheld laser fluorescence spectrum probe assembly according to claim 1, wherein the optical fiber comprises a master optical fiber, a first optical fiber configured to transmit excited light, a second optical fiber configured to transmit guiding light, and a third optical fiber configured to receive fluorescence,
    wherein a first end of the master optical fiber is inserted in the handheld pen-like tube, and one end of each of the first optical fiber, the second optical fiber, and the third optical fiber is connected with a second end of the master optical fiber.

9. The handheld laser fluorescence spectrum probe assembly according to claim 8, wherein one end of each of the first optical fiber, the second optical fiber, and the third optical fiber away from the master optical fiber is provided with an SMA905 joint.

10. The handheld laser fluorescence spectrum probe assembly according to claim 5, wherein a connector is fixedly provided on an outer wall of the optical fiber; and the connector is in detachable connection with the second end of the handheld pen-like tube.

11. The handheld laser fluorescence spectrum probe assembly according to claim 8, wherein the master optical fiber is connected with the first optical fiber, the second optical fiber, and the third optical fiber through a one-to-three optical splitter.

12. The handheld laser fluorescence spectrum probe assembly according to claim 8, wherein the handheld pen-like tube is in threaded connection with the tube sleeve.

13. The handheld laser fluorescence spectrum probe assembly according to claim 8, wherein a connector is fixedly provided on an outer wall of the optical fiber; and
the connector is in detachable connection with the second end of the handheld pen-like tube.

14. The handheld laser fluorescence spectrum probe assembly according to claim 1, wherein the handheld pen-like tube is in threaded connection with the tube sleeve.

15. The handheld laser fluorescence spectrum probe assembly according to claim 1, wherein a connector is fixedly provided on an outer wall of the optical fiber; and
the connector is in detachable connection with the second end of the handheld pen-like tube.

16. The handheld laser fluorescence spectrum probe assembly according to claim 15, wherein the connector is an externally-threaded nut, and the externally-threaded nut is in threaded connection with the handheld pen-like tube.

\* \* \* \* \*